US008743860B2

(12) United States Patent
Lee et al.

(10) Patent No.: US 8,743,860 B2
(45) Date of Patent: Jun. 3, 2014

(54) METHOD AND SYSTEM FOR EFFICIENTLY SCHEDULING SHORT RANGE WIRELESS DATA TRANSMISSIONS

(75) Inventors: HyungJune Lee, San Jose, CA (US); Justin Aimin Sang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 331 days.

(21) Appl. No.: 13/165,649

(22) Filed: Jun. 21, 2011

(65) Prior Publication Data
US 2012/0327925 A1    Dec. 27, 2012

(51) Int. Cl.
*H04J 3/00* (2006.01)
*H04W 4/00* (2009.01)
*H04W 74/04* (2009.01)

(52) U.S. Cl.
CPC .................................. *H04W 74/04* (2013.01)
USPC .......................................... 370/345; 370/329

(58) Field of Classification Search
USPC .......................................... 370/345, 347–348
See application file for complete search history.

(56) References Cited

U.S. PATENT DOCUMENTS

| | | | |
|---|---|---|---|
| 2008/0080378 A1* | 4/2008 | Kim et al. ...................... | 370/234 |
| 2010/0195603 A1* | 8/2010 | Ho ................................. | 370/329 |
| 2010/0317388 A1* | 12/2010 | Chu et al. ...................... | 455/509 |
| 2012/0177016 A1* | 7/2012 | Trainin et al. .................. | 370/338 |

* cited by examiner

*Primary Examiner* — Afshawn Towfighi
(74) *Attorney, Agent, or Firm* — Oblon, Spivak, McClelland, Maier & Neustadt, L.L.P.

(57) ABSTRACT

According to one disclosed embodiment, a method for efficiently scheduling short-range wireless data transmissions is described. This method may include providing beacon intervals for timed data transmission, receiving a plurality of requests for data, delaying allocation of any of the plurality of requests for data into one of the beacon intervals until a number of admitted requests for data exceeds a threshold. The method may also include allocating timeslots for pseudo-static service periods before allocating timeslots for non-pseudo static service periods and allocating timeslots for non-pseudo static service periods in descending order of relative time urgency.

20 Claims, 4 Drawing Sheets

METHOD AND SYSTEM FOR EFFICIENTLY SCHEDULING SHORT RANGE WIRELESS DATA TRANSMISSIONS

BACKGROUND OF THE INVENTION

1. Field of the Invention

The present invention is generally in the field of electronic circuits and systems. More specifically, the present invention is in the field of communications circuits and systems.

2. Background Art

In the field of wireless communications, 60 GHz technology pursues very high throughput in short-range wireless data transmissions, making possible, for example, real-time uncompressed HD video and audio transfers over wireless data networks. To enable this inherent high-speed data transfer, the 60 GHz standard explicitly defines a requirement called a Traffic Specification (TSPEC) for handling and allocating timeslots for data transfer between high-speed devices. The TSPEC may specify an allocation period over which the allocation repeats, a minimum allocation time and a maximum allocation time for each high-speed data transfer, with each complete data transfer collectively called a traffic stream. Each traffic stream is further comprised of one or more individual timeframes during which data is transferred, called service periods. Typically, there are two types of service periods: 1) pseudo-static and 2) non-pseudo static. Pseudo-static service periods recur at the same target transmission time within an interval, called a beacon interval, regardless of whether the pseudo-static service periods occur in successive beacon intervals or not, whereas non-pseudo static service periods are not required to recur at the same target transmission time within beacon intervals.

In a conventional 60 GHz data technology system a traffic stream is established between a Requesting Device and a Control Device, or unconventionally between two Requesting Devices. A Requesting Device sends a data request carrying a TSPEC, which defines the timing and traffic requirements of the data request. This data request is received by the Control Device. The Control Device determines whether to admit the data request and if admitted, the Control Device may then allocate one or more service periods and announce the service period allocations comprising the traffic stream to the one or more Requesting Devices.

Conventional service period scheduling approaches have traditionally degraded the efficiency of time usage in the system during data transmission in high-speed devices. FIG. 1 shows an exemplary timing diagram representative of a conventional method for scheduling short-range wireless data transmissions. FIG. 1 shows a plurality of fixed-length beacon intervals, each including a length-varying non-data transfer time (non-DTT) period 101 located at the beginning of respective beacon intervals, during which no data may be transferred.

According to this conventional scheduling approach, for example, the Control Device may receive multiple data requests carrying TSPEC1, TSPEC2, TSPEC3, TSPEC4, and TSPEC5, respectively, in time order. In this conventional scheduling approach time slots are allocated for the maximum allocation needed to transfer the requested data in each service period as soon as the Control Device admits a TSPEC. Thus, the TSPEC 1 service period 110 is allocated to beacon interval 1 adjacent the non-DTT period 101 and the TSPEC2 service period 120 is then allocated to beacon interval 1 adjacent TSPEC1 service period 110. However, when the Control Device receives and admits TSPEC3 service period 130, which is pseudo-static having a period of one beacon interval, insufficient timeslots are available in beacon interval 1 to allocate the TSPEC3 service period 130. Thus, the Control Device is forced to allocate the first TSPEC3 service period 130 at the end of beacon interval 2, rather than beacon interval 1 and, because it recurs every beacon interval, to the end of each of beacon intervals 3-8 as well, for example.

Moreover, according to a conventional scheduling approach, the Control Device might allocate the pseudo-static allocations of TSPEC4 service period 140, having a period of two beacon intervals, to every other beacon interval starting with beacon interval 2, as shown in FIG. 1. As can be seen, this inefficient allocation creates fragments of unusable timeslots between non-DTT periods 101 and TSPEC4 service periods 140 in beacon intervals 2 and 4. When the Control Device receives TSPEC5, the conventional scheduling algorithm cannot allocate its service period 150 to beacon interval 2, as shown by the "X", and is forced to allocate it to beacon interval 3 since the conventional scheduling algorithm allocates a service period for a particular request for data all at once and immediately upon admission. Therefore, the conventional scheduling approach tends to create unnecessary fragments of unusable timeslots in beacons 2 and 4, and may fail the required allocation for TSPEC3 service period 130 in beacon interval 1, for example, as indicated in FIG. 1.

Thus, there is a need to overcome the drawbacks and deficiencies in the art by providing a service period scheduling solution enabling more efficient allocation of data requests to each beacon interval, and designed to avoid failures in allocation of critical data.

SUMMARY OF THE INVENTION

The present invention is directed to a method and system for efficiently scheduling short-range wireless data transmissions, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
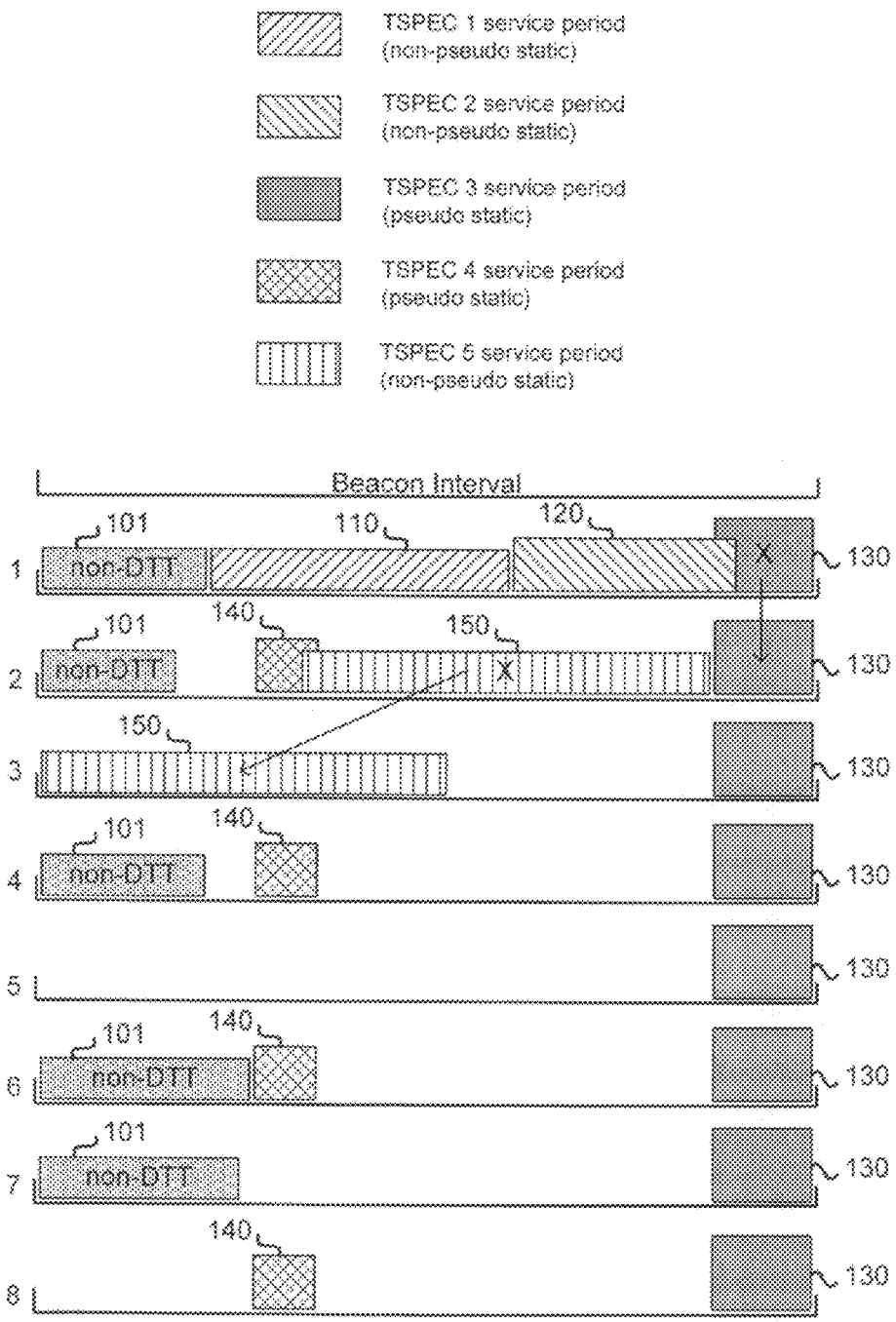
FIG. 1 shows a timing diagram representative of a conventional method for scheduling short-range wireless data transmissions.

The present invention is directed to a method and system for efficiently scheduling short range wireless data transmissions. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Figure 2:
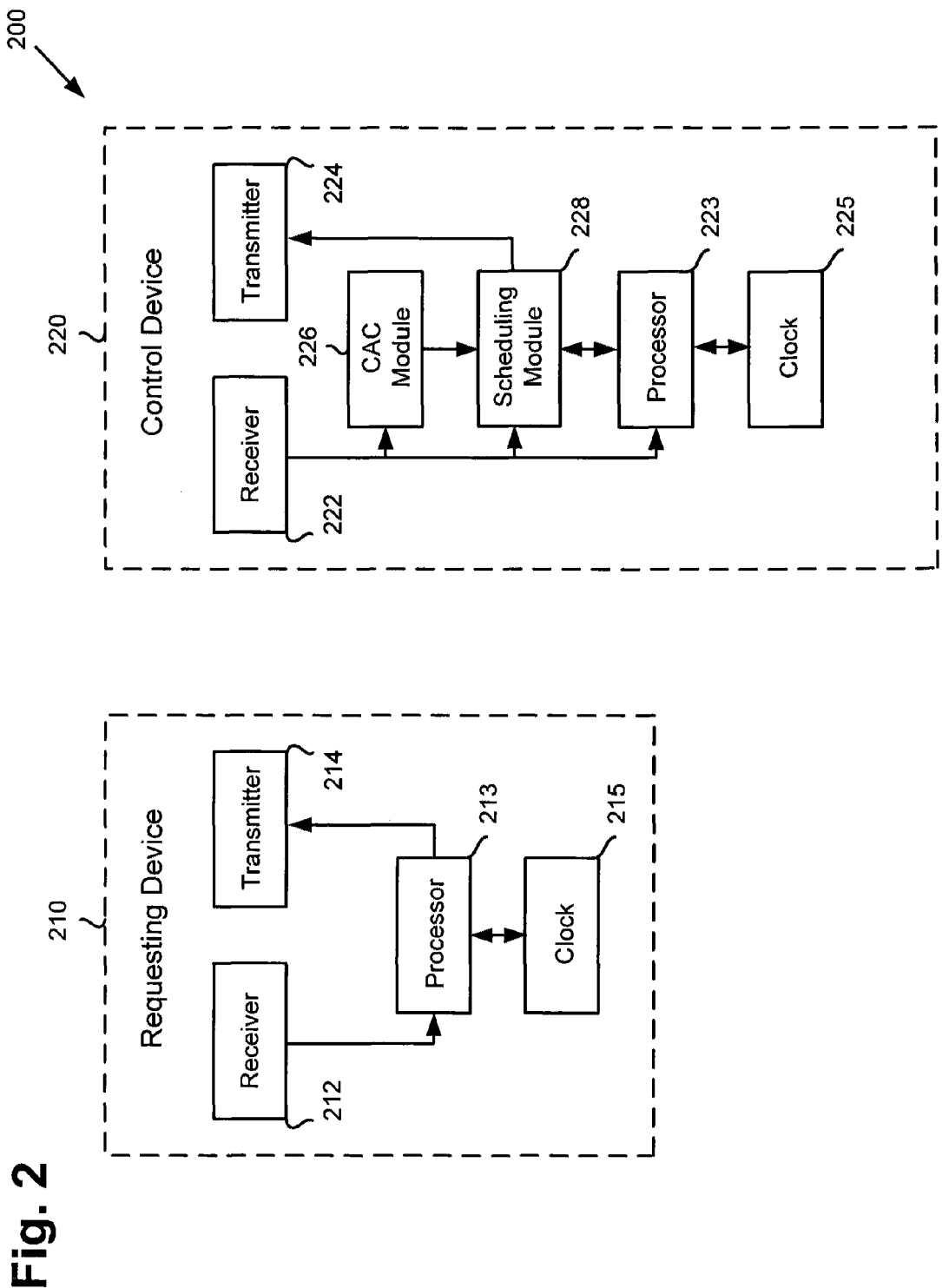
FIG. 2 shows a diagram of a system for efficiently scheduling short-range wireless data transmissions, according to one embodiment of the present invention.

FIG. 2 shows system 200 for efficiently scheduling short-range wireless data transmissions, according to one embodiment of the present invention, which is capable of overcoming the drawbacks and deficiencies identified with the conventional art. According to the embodiment of FIG. 2, system 200 is configured to include at least Requesting Device 210, shown in FIG. 2 and Control Device 220. Requesting Device 210 may comprise receiver 212, processor 213, transmitter 214 and clock 215, and may be configured to initiate one or more requests for data and receive timed data transmissions embedded within one or more beacon intervals. Within Requesting Device 210, receiver 212 may be connected to processor 213 and may be configured to receive timed data transmissions from another device, for example, Control Device 220, in the form of multiple service periods embedded in one or more beacon intervals. Transmitter 214 may also be connected to processor 213 and may be configured to transmit one or more requests for data to another device, for example, Control Device 220. Clock 215 may be connected to processor 213 and may enable Requesting Device 210 to track timing intervals necessary to the operation of one or more embodiments of the present invention.

Control Device 220 may comprise, for example, receiver 222, processor 223, transmitter 224, clock 225, connection admission control (CAC) module 226 and Scheduling Module 228. Receiver 222 may be configured to receive one or more requests for data from Requesting Device 210. Transmitter 224 may be connected to processor 223 and may be configured to periodically transmit data embedded within one or more beacon intervals to Requesting Device 210. Clock 225 may be connected to processor 223 and may enable Control Device 220 to track timing intervals necessary to the operation of one or more embodiments of the present invention. Scheduling Module 228, connected to CAC module 226, receiver 222, transmitter 224 and processor 223, may be configured to optimally schedule timed data transmissions during one or more beacon intervals after delaying allocation of a plurality of request for data until the number of admitted requests for data exceeds a certain threshold, which is normally an engineering parameter that can be fine tuned for better performance. This threshold may be sixteen (16) admitted requests for data, for example. However, one of ordinary skill would understand that this threshold value may be more or less than sixteen (16) admitted requests for data depending on the particular application to which the present invention is applied. CAC Module 226, connected to receiver 222 and Scheduling Module 228, may be configured to admit, delay or reject received requests for data from Requesting Device 210 and if admitted, send those received requests for data to Scheduling Module 228, for example, based on the number and characteristics of already admitted requests for data, which will be described in greater depth in connection with FIGS. 3 and 4. It should be understood that, although FIG. 2 discloses a Requesting Device 210 and Control Device 220, the present invention may also include embodiments in which Requesting Device 210 may also include the necessary features to allow it to send data transmissions to one or more other Requesting Devices 210 when required. In such a situation, the Control Device 220 may allocate all timed data transmissions according to an embodiment of the present invention. At the scheduled time for transmission of data from one Requesting Device 210 to the one or more other Requesting Devices 210, the data transmission may then occur between the one Requesting Device 210 and the one or more other Requesting Devices 210, rather than between the Control Device 220 and the Requesting Device 210. Thus, regardless of which devices timed data transfers occur between, the Control Device 220 is responsible for the scheduling of all timed data transfers in the system.

Figure 3:
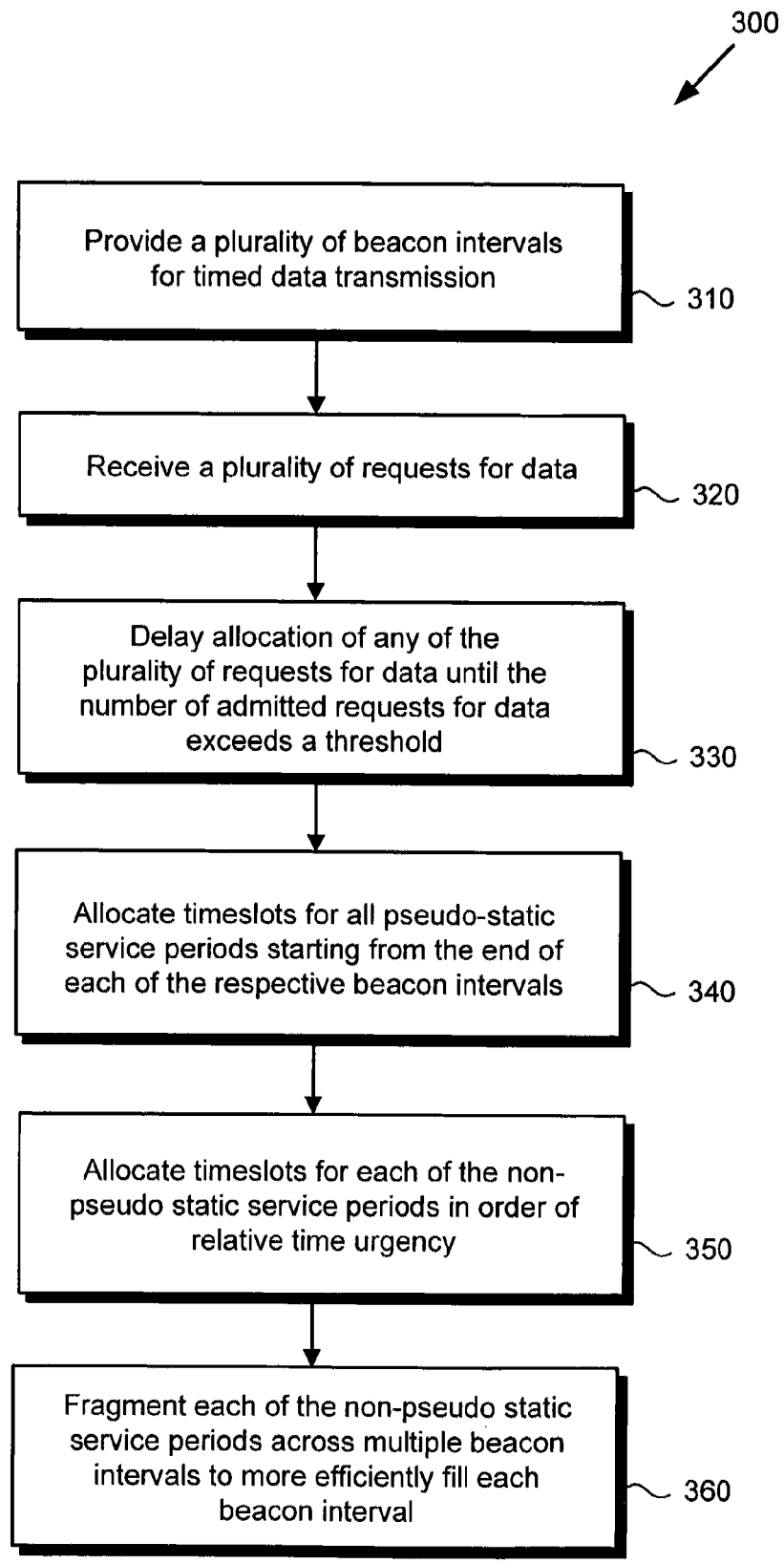
FIG. 3 shows a flowchart describing steps taken to implement a method for efficiently scheduling short-range wireless data transmissions, according to an embodiment of the present invention.
Figure 4:
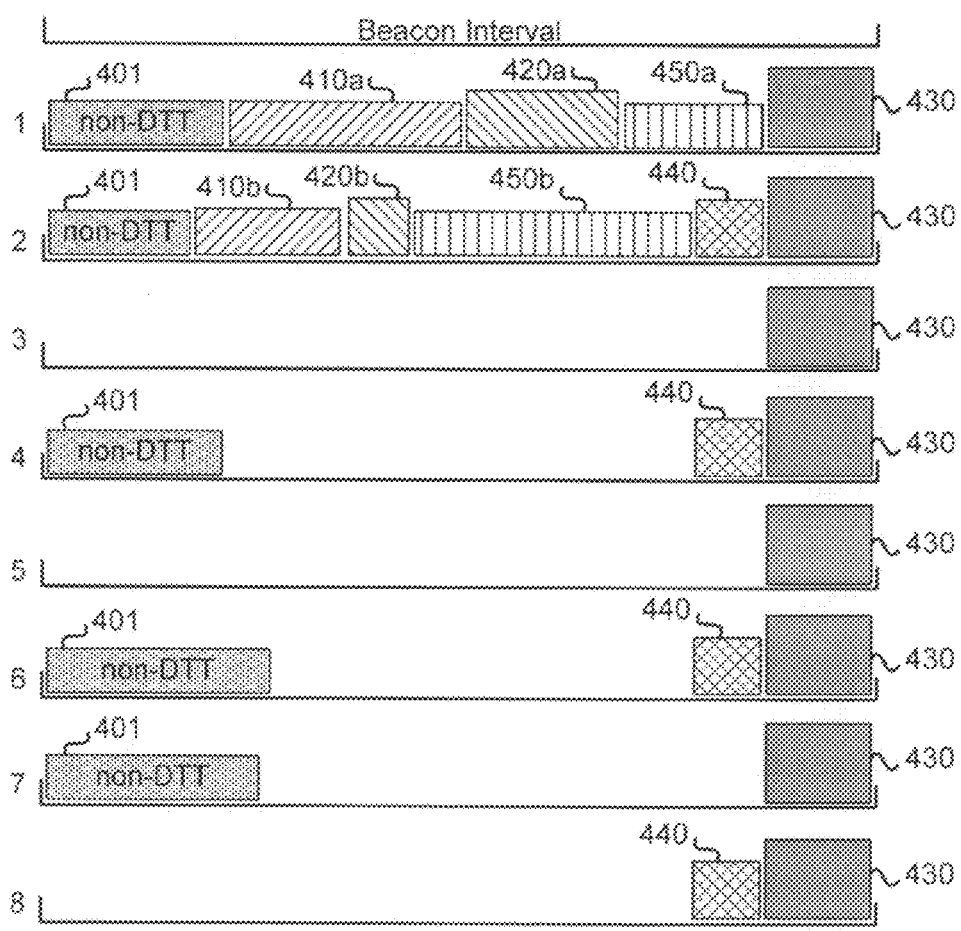
FIG. 4 shows a timing diagram representative of a method for efficiently scheduling short-range wireless data transmissions, according to an embodiment of the present invention.

The operation of system 200 will be further described by reference to FIGS. 3 and 4. FIG. 3 shows a flowchart describing steps taken to implement a method for efficiently scheduling short-range wireless data transmissions, according to one embodiment of the present invention, while FIG. 4 shows a timing diagram representative of a method for efficiently scheduling short-range wireless data transmissions utilizing one or more embodiments of the present invention. With respect to FIG. 3, it is noted that certain details and features have been left out of flowchart 300 that are apparent to a person of ordinary skill in the art. For example, a step may comprise one or more substeps, as known in the art. While steps 310 through 360 indicated in flowchart 300 are sufficient to describe at least one embodiment of the present method, other embodiments may utilize steps different from those shown in flowchart 300, or may include more, or fewer steps.

As shown in FIG. 3, step 310 of flowchart 300 comprises providing a plurality of beacon intervals for timed data transmission. Referring, for example, to FIG. 2, step 310 may be performed by Control Device 220 in anticipation of receipt of one or more requests for data from one or more Requesting Devices 210. According to WGA 60 GHz wireless specification, beacon intervals are simply fixed-length time periods during which data transmissions are scheduled to take place between high-speed devices, such as Requesting Device 210 and Control Device 220. An example of typical beacon intervals is illustrated in FIGS. 1 and 4 as beacon intervals 1-8.

Continuing with step 320 of FIG. 3, step 320 comprises receiving a plurality of requests for data. According to the embodiment shown in FIG. 2, for example, step 320 may correspond to receipt, by Control Device 220, of one or more requests for data from one or more Requesting Devices 210. Each such request for data may include a TSPEC which may specify, for example, the allocation period over which an allocation for data transmission is required to repeat, as well as a minimum allocation time and maximum allocation time for the requested data. This TSPEC provides data transmission information necessary to the initial creation, modification, and allocation of the service periods which contain the requested data transmitted between devices.

Once Control Device 220 receives a request for data from a Requesting Device 210, the Control Device 220 must determine whether it can accommodate the new service period for transmission of the requested data within one or more upcoming beacon intervals by utilizing a connection admission control (CAC) algorithm. According to the embodiment shown in FIG. 2, for example, the CAC algorithm may be implemented by the CAC Module 226. The CAC algorithm admits, delays or denies admission of a request for data according to a metric called the stress ratio, which is calculated by summing the required time allocations of the service periods of all already admitted requests for data and dividing this value by the total data transmission time period of all allocated beacon intervals, which is equal to the total time of all allocated beacon intervals minus the non data transmission (non-DTT) times 401, as shown in FIG. 4. If the current stress ratio is less than a certain threshold, 0.6 for example, the CAC algorithm may admit the request for data for scheduling. This threshold is normally an engineering parameter that can be fine tuned for better system performance. Otherwise, the Control Device 220 lists up all available timeslots from all beacon intervals and determines if the needed amount of allocation, specified by the TSPEC contained in the request for data, can fit into the beacon intervals. If so, the request for data is admitted for scheduling by Scheduling Module 228, for example. If not, the request for data is either delayed or denied by the CAC algorithm. It should be understood that since other threshold values may be used as well, the present invention does not exclude the possibility of using a different threshold value. It should be further understood that the CAC algorithm may be implemented to admit requests for data before and after the number of admitted requests for data exceeds a certain threshold, as will be disclosed next.

Moving on to step 330 of FIG. 3, step 330 comprises delaying allocation of any of the plurality of requests for data until the number of admitted requests for data exceeds a threshold. Step 330 may be performed by Control Device 220, in FIG. 2, for example. Each admitted request for data, containing a respective TSPEC, is eventually allocated a certain time period, comprised of one or more service periods, within one or more beacon intervals, during which the requested data may be transmitted from one device to another, for example, from Control Device 220 to Requesting Device 210 of FIG. 2. However, rather than allocating each request for data immediately upon receipt, as is done conventionally, an embodiment of the present invention may wait to begin scheduling and allocation until the number of admitted requests for data exceeds a threshold, for example sixteen (16) admitted requests for data, although this threshold may be greater or less than this number depending on the application to which the present invention is employed. This delay may also be signaled by including a delay element inside the TSPEC of a particular request for data. By waiting to allocate received requests for data until a certain number of requests have been admitted allows the scheduling algorithm of the present invention to optimize scheduling and allocation such that the amount of unusable data transfer time within each beacon interval can be substantially minimized or even eliminated altogether, allowing higher throughput and better efficiency in the scheduling of short-range wireless transmissions. The effect of step 330 may be further shown in FIG. 4 in that no allocations are made until requests for data containing TSPEC 1 through TSPEC 5 are received, necessitating allocation of TSPEC service periods 410 through 450, respectively.

As was previously stated, a TSPEC may specify one of two types of service periods for data transmission: 1) pseudo-static, wherein the service period recurs at the same relative time offset within each respective beacon interval, and 2) non-pseudo static service periods, which do not. As can be seen in FIG. 4, TSPEC3 service periods 430 and TSPEC service periods 440 are pseudo-static while TSPEC1 service periods 410, TSPEC2 service periods 420 and TSPEC5 service periods 450 are non-pseudo static. As can be appreciated, due to the same offset constraint, pseudo-static service periods are inherently harder to find available time allocation consistently over beacon intervals, as compared to non-pseudo-static service periods.

Therefore, step 340 comprises allocating timeslots for all pseudo-static service periods starting from the end of each of the respective beacon intervals. Referring, for example, to FIG. 2, step 340 may be performed by Scheduling Module 228. Allocating all pseudo-static service periods starting from the end of each of the respective beacon intervals allows each pseudo-static service period to be allocated with the required same time offset from one beacon interval to the next, while eliminating short unusable sections of data transfer time adjacent the non-DTT periods 401 which result from non-DTT periods 401 being of varying length, as can be seen in FIG. 4. Furthermore, allocating timeslots for pseudo-static service periods before allocating timeslots for non-pseudo static service periods further ensures that there is enough time in each beacon interval to allocate all admitted pseudo-static service periods.

According to an embodiment of the present invention, timeslots may further be allocated for pseudo-static service periods in descending order of service period length. Because longer, repeating service periods are harder to place than shorter ones, allocating pseudo-static service periods in descending order of service period length further ensures that all service periods receive a proper allocation. Similarly, an embodiment of the present invention may further allocate timeslots for pseudo-static service periods in descending order of allocation frequency. For similar reasons, repeating pseudo-static service periods that repeat more often are harder to place than those that repeat less often, and thus allocating in this way further ensures that all service periods receive a proper allocation.

The effect of step 340 on timing and allocation is disclosed in FIG. 4. TSPEC3 service periods 430 and TSPEC4 service periods 440 are pseudo-static and so are allocated first, starting at the end of each beacon interval. However, because service periods 430 have longer service period lengths and higher allocation frequency than service periods 440, every one beacon interval versus every two beacon intervals, service periods 430 are allocated before service periods 440, according to step 340 of FIG. 3.

Additionally, step 350 of FIG. 3 comprises allocating timeslots for each of the non-pseudo static service periods in order of relative time urgency. Referring, for example, to FIG. 2, step 350 may also be performed by Scheduling Module 228. For the purposes of the present invention, relative time urgency may be defined as the remaining timeslots to be allocated within a current allocation period, divided by the remaining time until the end of the allocation period, for each non-pseudo static service period. However, in the alternative, an embodiment of the present invention may allocate timeslots for non-pseudo static service periods in ascending order of the remaining time in an allocation period of each non-pseudo static service period. Thus, non-pseudo static service periods having a closer deadline as to when they must be transmitted should be allocated first, among admitted non-pseudo static service periods. Where two or more admitted non-pseudo static service periods have the same time remaining in their respective allocation periods, non-pseudo static service periods may be further allocated in descending order of service period duration. Regardless of which algorithm is used to allocate timeslots for the non-pseudo static service periods, those timeslots should be allocated adjacent already allocated pseudo-static service periods to ensure the closest possible packing of allocations within each beacon interval.

Step 360 of FIG. 3 comprises fragmenting each of the non-pseudo static service periods across multiple beacon intervals to more efficiently fill each beacon interval. Referring, for example, to FIG. 2, step 360 may also be performed by Scheduling Module 228. In an embodiment of the present invention, as long as the total allocation for all fragments of a non-pseudo static service period total the maximum allocation and no fragment is smaller than the minimum allocation given by that service period's TSPEC, the allocation may consist of multiple, disjoint service periods spread across multiple beacon intervals. Fragmentation and allocation of each non-pseudo static service period may be further determined according to relative time urgency as disclosed above. When the allocation finishes for a beacon interval, Control Device 220 keeps performing this allocation strategy until the remaining allocation for all admitted non-pseudo static service periods is zero.

The effect of steps 350 and 360 on timing and allocation is shown in FIG. 4 as well. TSPEC1 service periods 410, TSPEC2 service periods 420 and TSPEC5 service periods 450 are non-pseudo static and so are allocated after and adjacent to pseudo static service periods within each beacon interval. According to step 360 service periods 410, 420 and 450 are fragmented across multiple beacon intervals to more efficiently fill each beacon interval, allocated in an order according to relative time urgency of each service period. Thus, beacon interval 1 includes non-pseudo static service periods 410a, 420a and 450a in fragment lengths and order according to each of their respective relative time urgencies calculated at the time of allocation into beacon interval 1. Similarly, beacon interval 2 includes non-pseudo static service periods 410b, 420b and 450b in fragment lengths and order according to each of their respective relative time urgencies calculated at the time of allocation into beacon interval 2. As can be seen in FIG. 4, a method according to an embodiment of the present invention allows a more efficient allocation of service periods into each of the beacon intervals substantially reducing or eliminating unusable fragments of data transmission time adjacent the non-data transmission times 401. Moreover, the result is a 100% allocation of all service periods within the first two beacon intervals, for example.

Thus, the present invention, according to various embodiments, allows efficient scheduling of short-range wireless data transmissions while minimizing or eliminating unusable data transmission time within beacon intervals in high-speed wireless data transmissions. Conventional methods have been incapable of guaranteeing proper allocation of all admitted service periods within fixed-time beacon interval periods, however, the present invention, according to its various embodiments, addresses and eliminates these issues.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method for scheduling wireless data transmissions, the method comprising:
providing beacon intervals for timed data transmission;
receiving a plurality of requests for data;
delaying allocation of any of the plurality of requests for data into one of the beacon intervals until a number of admitted requests for data exceeds a threshold;
fragmenting non-pseudo static service periods across multiple of the beacon intervals; and
allocating timeslots for the non-pseudo static service periods in an order of relative time urgency, wherein the relative time urgency is defined as the remaining timeslots to be allocated within a current allocation period divided by the remaining time until the end of the allocation period, for each of the non-pseudo static service periods.

2. The method of claim 1, further comprising allocating timeslots for pseudo-static service periods before allocating timeslots for the non-pseudo static service periods.

3. The method of claim 1, further comprising allocating timeslots for pseudo-static service periods in descending order of service period length.

4. The method of claim 1, further comprising allocating timeslots for pseudo-static service periods in descending order of allocation frequency.

5. The method of claim 1, wherein timeslots for pseudo-static service periods are allocated at the same time offset in each beacon interval for the same traffic stream.

6. The method of claim 1, further comprising allocating timeslots for the non-pseudo static service periods in ascending order of the remaining time in an allocation period of each of the non-pseudo static service periods.

7. The method of claim 1, further comprising allocating the non-pseudo static service periods having equal time remaining in an allocation period in descending order of service period duration.

8. The method of claim 1, wherein the order is a descending order.

9. The method of claim 1, further comprising admitting an additional request for data according to a connection admission control (CAC) algorithm after the number of admitted requests for data has exceeded the threshold and allocation has begun.

10. The method of claim 9, wherein the CAC algorithm admits the additional request if the additional requests for data can be allocated into available timeslots.

11. A method for scheduling wireless data transmissions, the method comprising:
providing beacon intervals for timed data transmission;
receiving a plurality of requests for data;
delaying allocation of any of the plurality of requests for data into one of the beacon intervals until a number of admitted requests for data exceeds a threshold; and
fragmenting non-pseudo static service periods across multiple of the beacon intervals;
wherein the fragmenting of the non-pseudo static service periods across multiple beacon intervals is based on relative time urgency, wherein the relative time urgency is defined as the remaining timeslots to he allocated within a current allocation period divided by the remaining time until the end of the allocation period, for each of the non-pseudo static service periods.

12. The method of claim further comprising allocating timeslots for pseudo-static service periods before allocating timeslots for the non-pseudo static service periods, and wherein the non-pseudo static service periods are allocated adjacent allocated pseudo-static service periods.

13. A method for scheduling wireless data transmissions, the method comprising:

providing beacon intervals for timed data transmission;
receiving a plurality of requests for data;
delaying allocation of any of the plurality of requests for data into one of the beacon intervals until a number of admitted requests for data exceeds a threshold; and
fragmenting non-pseudo static service periods across multiple of the beacon intervals;
wherein the threshold is sixteen admitted requests for data.

14. A method for scheduling wireless data transmissions, the method comprising:
providing beacon intervals for timed data transmission;
receiving a plurality of requests for data;
delaying allocation of any of the plurality of requests for data into one of the beacon intervals until a number of admitted requests for data exceeds a threshold; and
admitting an additional request for data according to a connection admission control (CAC) algorithm after the number of admitted requests for data has exceeded the threshold and allocation has begun;
wherein the CAC algorithm admits the additional request if the total required allocation for all admitted requests for data divided by the total data transfer time of the beacon intervals is below a second threshold.

15. The method of claim 14, wherein the second threshold is 0.6.

16. A system for scheduling wireless data transmissions, the system comprising:
a control device including a receiver, a transmitter and a scheduling module, the control device configured to:
provide beacon intervals for timed data transmission;
receive a plurality of requests for data;
delay allocation of any of the plurality of requests for data into one of the beacon intervals until a number of admitted requests for data exceeds a threshold; and
fragment non-pseudo static service periods across multiple of the beacon intervals;
wherein the fragmenting of the non-pseudo static service periods across multiple beacon intervals is based on relative time urgency, wherein the relative time urgency is defined as the remaining timeslots to he allocated within a current allocation period divided by the remaining time until the end of the allocation period, for each of the non-pseudo static service periods.

17. The system of claim 16, further comprising a requesting device configured to receive the plurality of service requests within the beacon intervals.

18. The system of claim 16, wherein the control device further includes a connection admission control module configured to admit additional requests for data after allocation has begun based on availability of timeslots within a respective beacon interval.

19. The system of claim 16, wherein the system utilizes a WGA 60 GHz wireless specification.

20. A system for scheduling wireless data transmissions, the system comprising:
a control device including a receiver, a transmitter and a scheduling module, the control device configured to:
provide beacon intervals for timed data transmission;
receive a plurality of requests for data;
delay allocation of any of the plurality of requests for data into one of the beacon intervals until a number of admitted requests for data exceeds a threshold; and
admit an additional request for data according to a connection admission control (CAC) algorithm after the number of admitted requests for data has exceeded the threshold and allocation has begun, wherein the CAC algorithm admits the additional request if the total required allocation for all admitted requests for data divided by the total data transfer time of the beacon intervals is below a second threshold.

* * * * *

UNITED STATES PATENT AND TRADEMARK OFFICE
CERTIFICATE OF CORRECTION

PATENT NO. : 8,743,860 B2
APPLICATION NO. : 13/165649
DATED : June 3, 2014
INVENTOR(S) : HyungJune Lee et al.

It is certified that error appears in the above-identified patent and that said Letters Patent is hereby corrected as shown below:

In the Claims

Column 8, line 57, Claim 11, change "he" to --be--

Column 8, line 61, Claim 12, insert --1-- after method of claim

Column 10, line 4, Claim 16, change "he" to --be--

Signed and Sealed this
Sixteenth Day of December, 2014

Michelle K. Lee
*Deputy Director of the United States Patent and Trademark Office*